US009755923B2

(12) United States Patent
Cama et al.

(10) Patent No.: US 9,755,923 B2
(45) Date of Patent: Sep. 5, 2017

(54) PREDICTIVE CLOUD PROVISIONING BASED ON HUMAN BEHAVIORS AND HEURISTICS

(71) Applicant: International Business Machines Corporation, Armonk, NY (US)

(72) Inventors: Karl J. Cama, Coppell, TX (US); Daniel T. Harrison, Newmarket (CA); Kenneth J. Muckenhaupt, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 237 days.

(21) Appl. No.: 14/055,474

(22) Filed: Oct. 16, 2013

(65) Prior Publication Data

US 2015/0106503 A1 Apr. 16, 2015

(51) Int. Cl.
*G06F 15/173* (2006.01)
*H04L 12/26* (2006.01)
*H04L 29/08* (2006.01)
*H04L 12/911* (2013.01)

(52) U.S. Cl.
CPC .......... *H04L 43/08* (2013.01); *H04L 43/0876* (2013.01); *H04L 47/823* (2013.01); *H04L 67/10* (2013.01); *H04L 67/22* (2013.01); *H04L 67/2838* (2013.01)

(58) Field of Classification Search
CPC ..... H04L 43/08; H04L 43/0876; H04L 47/70; H04L 67/22
See application file for complete search history.

(56) References Cited

U.S. PATENT DOCUMENTS

| | | | | |
|---|---|---|---|---|
| 7,979,371 | B2* | 7/2011 | Lake | 706/21 |
| 8,504,689 | B2* | 8/2013 | Ferris | G06F 9/5072 |
| | | | | 709/226 |
| 2005/0089063 | A1* | 4/2005 | Haruna et al. | 370/468 |
| 2011/0295999 | A1 | 12/2011 | Ferris et al. | |

(Continued)

OTHER PUBLICATIONS

Peter Mell, et al, "The NIST Definition of Cloud Computing (DRAFT): Recommendations of the National Institute of Standards and Technology," Special Publication 800-145, Computer Security, Jan. 2011, pp. 1-7.
Testimony of Cita M. Furlani,"Cloud Computing: Benefits and Risks of Moving Federal IT into the Cloud," National Institute of Standards and technology USDC, U.S. house of Representatives Committe on Oversight and Government Reform, Jul. 1, 2010, pp. 1-11.

(Continued)

*Primary Examiner* — Chirag R Patel
*Assistant Examiner* — Rachel J Hackenberg
(74) *Attorney, Agent, or Firm* — Cantor Colburn LLP

(57) ABSTRACT

A system for predictively provisioning cloud resources based on human behaviors and heuristics includes a computer processor and logic executable by the computer processor. The logic is configured to implement a method. The method includes monitoring a collection of events relating to a customer application as well as monitoring an infrastructure load on resources for the customer application. A causal relationship is evaluated between an event and the infrastructure load. A predictive rule is then constructed based on the causal relationship. Resource requirements are anticipated based on the predictive rule and a provisioning of resources in a service domain is requested for the anticipated resource requirements, according to exemplary embodiments.

6 Claims, 4 Drawing Sheets

(56) References Cited

U.S. PATENT DOCUMENTS

| | | |
|---|---|---|
| 2012/0131176 A1 | 5/2012 | Ferris et al. |
| 2012/0137002 A1 | 5/2012 | Ferris et al. |
| 2015/0067171 A1* | 3/2015 | Yum et al. .................. 709/226 |
| 2015/0100581 A1* | 4/2015 | O'Donnell .............. H04L 67/10 |
| | | 707/737 |

OTHER PUBLICATIONS

Diversity Limited, [online]; [retrieved on Jul. 23, 2013]; retrieved from the Internet http://diversity.net.nz/netuitive-brings-predictive-analysis-to-cloud-infrastructure/2010/11/18/ Ben Kepes, "Netuitive Brings Predictive Analysis to Cloud Infrastructure," Diversity Limited, Nov. 18, 2010, pp. 1-2.

IBM, [online]; [retrieved on Jul. 23, 2013]; retrieved from the Internet http://www-01.ibm.com/software/data/infosphere/stream-computing/smarter-governments.html IBM,"InfoSphere Streams for Smarter Governments," 2013, pp. 1-3.

Netuitive, [online]; [retrieved on Jul. 23, 2013]; retrieved from the Internet http://www.netuitive.com/products/patents.html Netuitive, Inc.,"Netuitive Patents," 2012, pp. 1-2.

Netuitive, [online]; [retrieved on Jul. 23, 2013]; retrieved from the Internet http://www.netuitive.com/products/technology/ Netuitive, Inc.,"Netuitive Technology: Open Solution Architecture for Predictive IT Analytics," Our Tecnology, 2012, pp. 1-2.

B. Urgaonkar, et al., "Agile Dynamic Provisioning of Multi-Tier Internet Applications," ACM Transactions on Autonomous and Adaptive Systems, vol. 3, No. 1, Article 1, Mar. 2008, pp. 1-39.

* cited by examiner

PREDICTIVE CLOUD PROVISIONING BASED ON HUMAN BEHAVIORS AND HEURISTICS

BACKGROUND

The present invention relates generally to cloud computing, and more specifically, to predictively provisioning cloud resources based on human behaviors and heuristics.

Cloud computing has introduced the ability to deploy specific workloads to loosely coupled compute resources on demand. These computing resources may include processors, memory, network, and storage which are provided within service domains (i.e., clouds) that provision the required middleware and applications in response to specific workload requests from service subscribers. Information technology organizations may typically create private clouds that provision resources for specific applications or may subscribe to public clouds that deliver information technology services and resources either for a fee or for free.

BRIEF SUMMARY

According to an embodiment of the present invention, a system for predictively provisioning cloud resources based on human behaviors and heuristics is provided. The system includes a computer processor and logic executable by the computer processor. The logic is configured to implement a method. The method includes monitoring a collection of events relating to a customer application as well as monitoring an infrastructure load on resources for the customer application. A causal relationship is evaluated between an event and the infrastructure load. A predictive rule is then constructed based on the causal relationship. Resource requirements are anticipated based on the predictive rule and a provisioning of resources in a service domain is requested for the anticipated resource requirements, according to exemplary embodiments.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
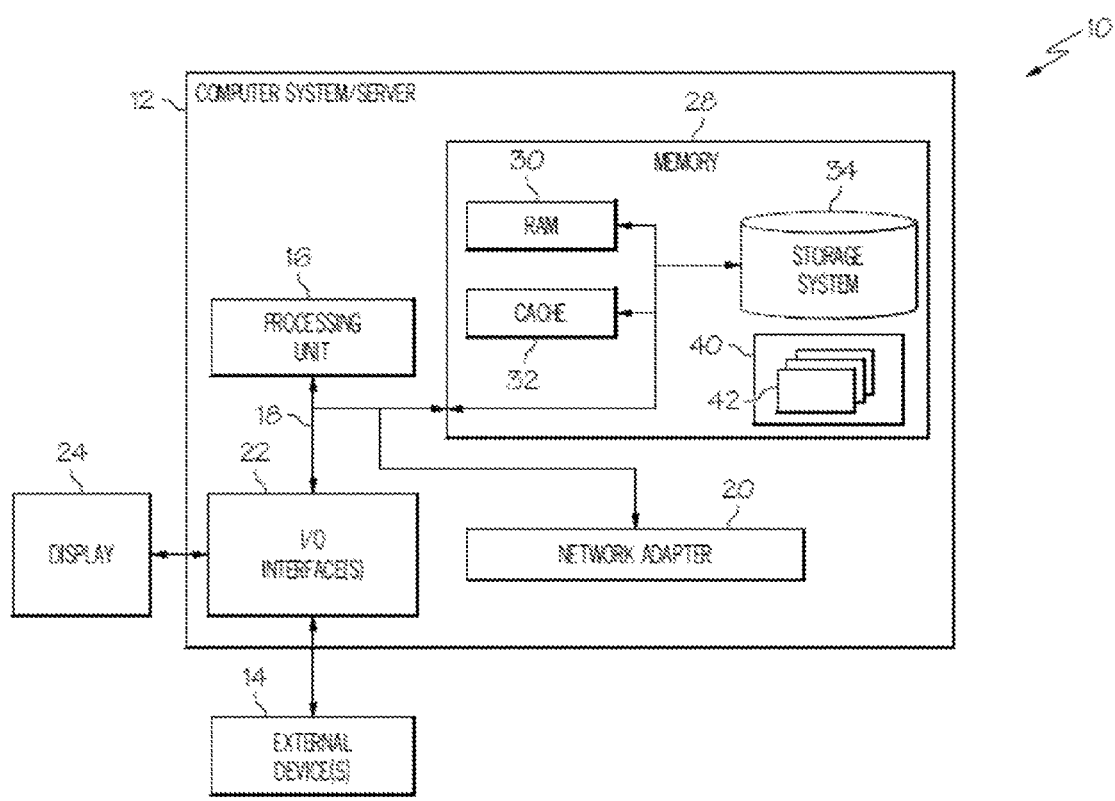
FIG. 1 depicts a cloud computing node according to an embodiment of the present invention.

Embodiments disclosed herein are directed to predictively provisioning cloud resources based on human behaviors and heuristics. Aspects of embodiments disclosed herein include monitoring a collection of events relating to a customer application as well as monitoring an infrastructure load on resources for the customer application. A causal relationship is evaluated between an event and the infrastructure load. A predictive rule is then constructed based on the causal relationship. Resource requirements are anticipated based on the predictive rule and a provisioning of resources in a service domain is requested for the anticipated resource requirements, according to exemplary embodiments.

Embodiments disclosed herein provide an extension to the contemporary cloud computing model by establishing a predictive capability for provisioning a set of cloud service resources located in private or global clouds. These cloud resource services may be deployed based on predictive analytics. The predictive analytics of embodiments include evaluating patterns of human behaviors coupled with applying heuristics to anticipate and provision the appropriate cloud resources to ensure capacity to meet customer requirements.

Exemplary embodiments provide a predictive capability to provision a set of service resources located in disparate clouds based on the influence of global heuristics and human behaviors. Analytics are used to refine and maintain these heuristics via a self-learning model and anticipate resultant human behavior based on prior actual resource usage according to an embodiment. Human reaction to global events may drive the need for additional computing resources in local geographies. For example, natural disasters or war may increase the need for health and human services or medical computing domains.

Conversely, the launch of a new technology, such as a smart phone, may drive social media channels or significant web traffic. According to embodiments, predictive clouds could anticipate the additional computing demands in a service domain and communicate with other clouds to proactively provision resources. Rather than wait for a calling application's request for services, the predictive cloud provisioning functionality of embodiments may construct a model of directed requirements and issue provisioning orders to other cloud provisioning services that would respond to the requirements. Over time, these connections would evolve to be more predictive including direct and indirect connections according to embodiments. As an example, political unrest may drive traffic to cancel vacations. In another example, the downgrade of a hurricane may in turn reduce the number of credit card purchases in a particular state as people stop stockpiling and buying emergency supplies. Such examples may define patterns that can be captured and added to a heuristics database for future reference according to embodiments.

It is understood in advance that although this invention includes a detailed description on cloud computing, implementation of the teachings recited herein are not limited to a cloud computing environment. Rather, embodiments of the invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of a cloud computing node for predictively provisioning cloud resources based on human behaviors and heuristics of an embodiment is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device, also referred to as a processing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnect (PCI) bus.

Computer system/server 12 may include a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
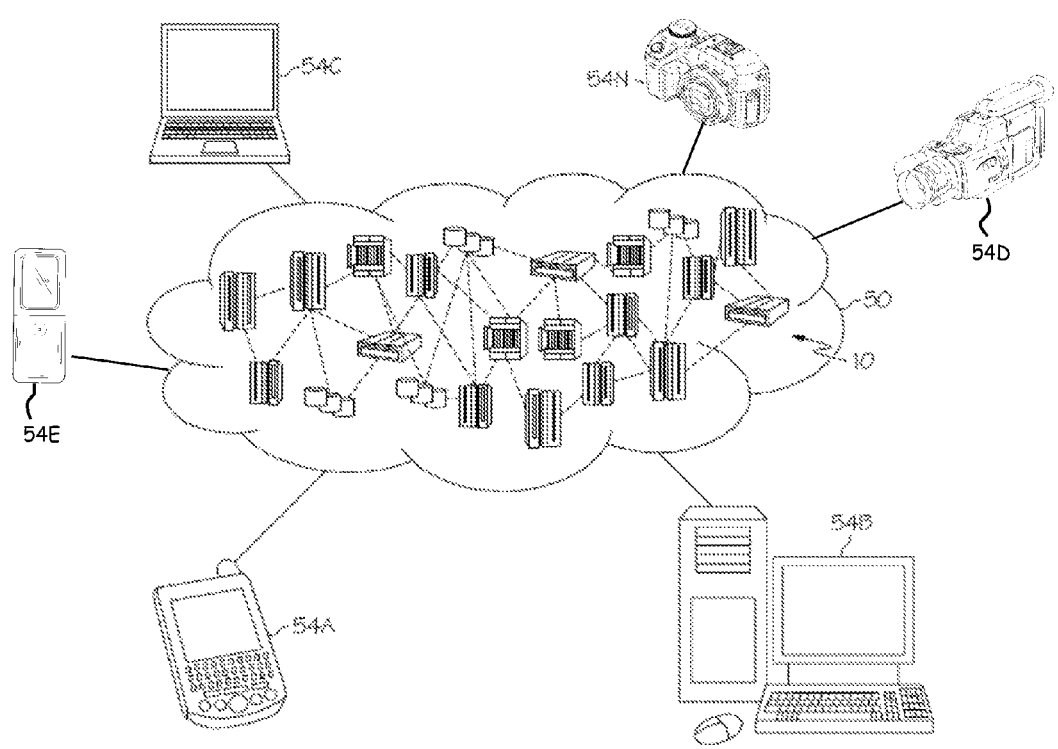
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, digital video camera 54D, digital audio recording device 54E, and/or digital still camera 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
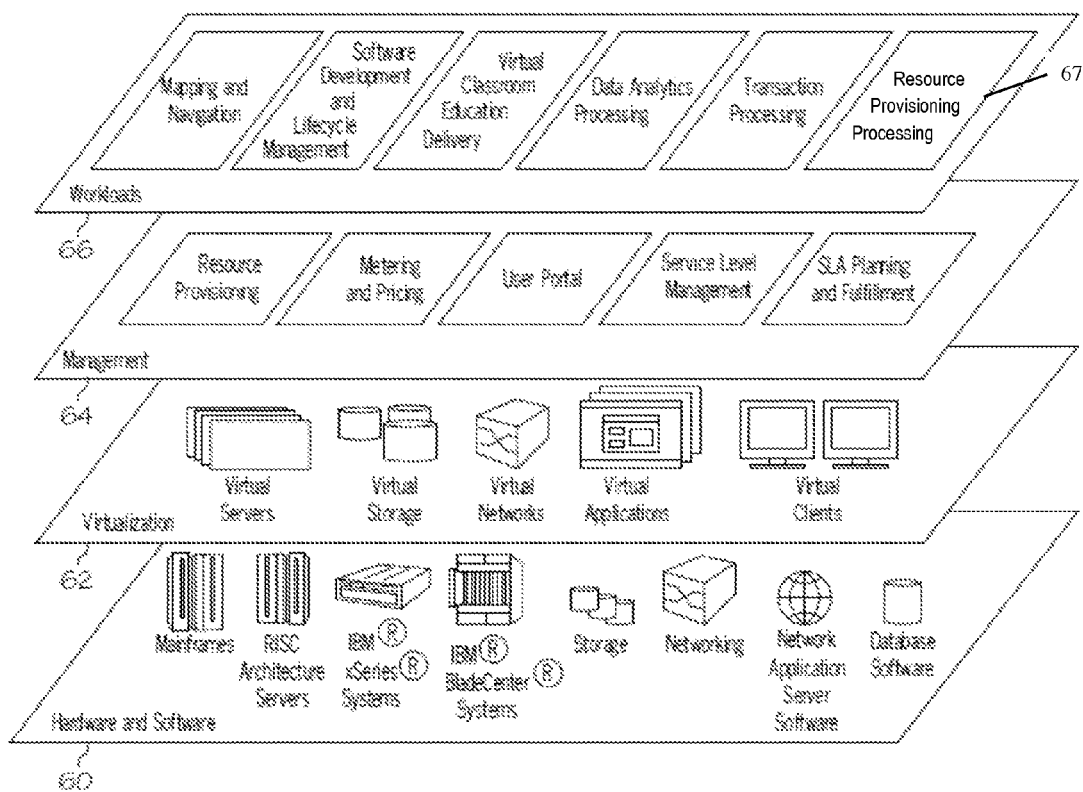
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and resource provisioning processing 67.

According to an exemplary embodiment, as world or local events unfold, resultant human behavior will start driving the need for cloud provisioning. Policies within a heuristic database of an embodiment may communicate within a local cloud and across disparate clouds broadcasting the need for specific provisioning via a service request. According to an embodiment, the service request may be forwarded to a cloud provisioning service, which would optimize the business rules (e.g., cost parameters, performance parameters, and/or location parameters) and dynamically provision a set of servers based on the configuration and programmatic requirements contained in the service request. The deployed cloud service may then operate on the requests and return results to the calling program.

A predictive dynamic cloud provisioning service of an embodiment includes routines that collect global and/or private information, which are both directly related and indirectly associated with the customer's application. The service of an embodiment also collects load characteristics that are used to create the predictive rules and causal analysis. As this information is collected and analyzed, the service of an embodiment generates resource requirements that are then applied against business rules to keep requests within approved guidelines and notification profiles. According to an embodiment, the appropriate application programming interfaces (APIs) are then invoked to create a unique request which can be provisioned from multiple clouds.

Figure 4:
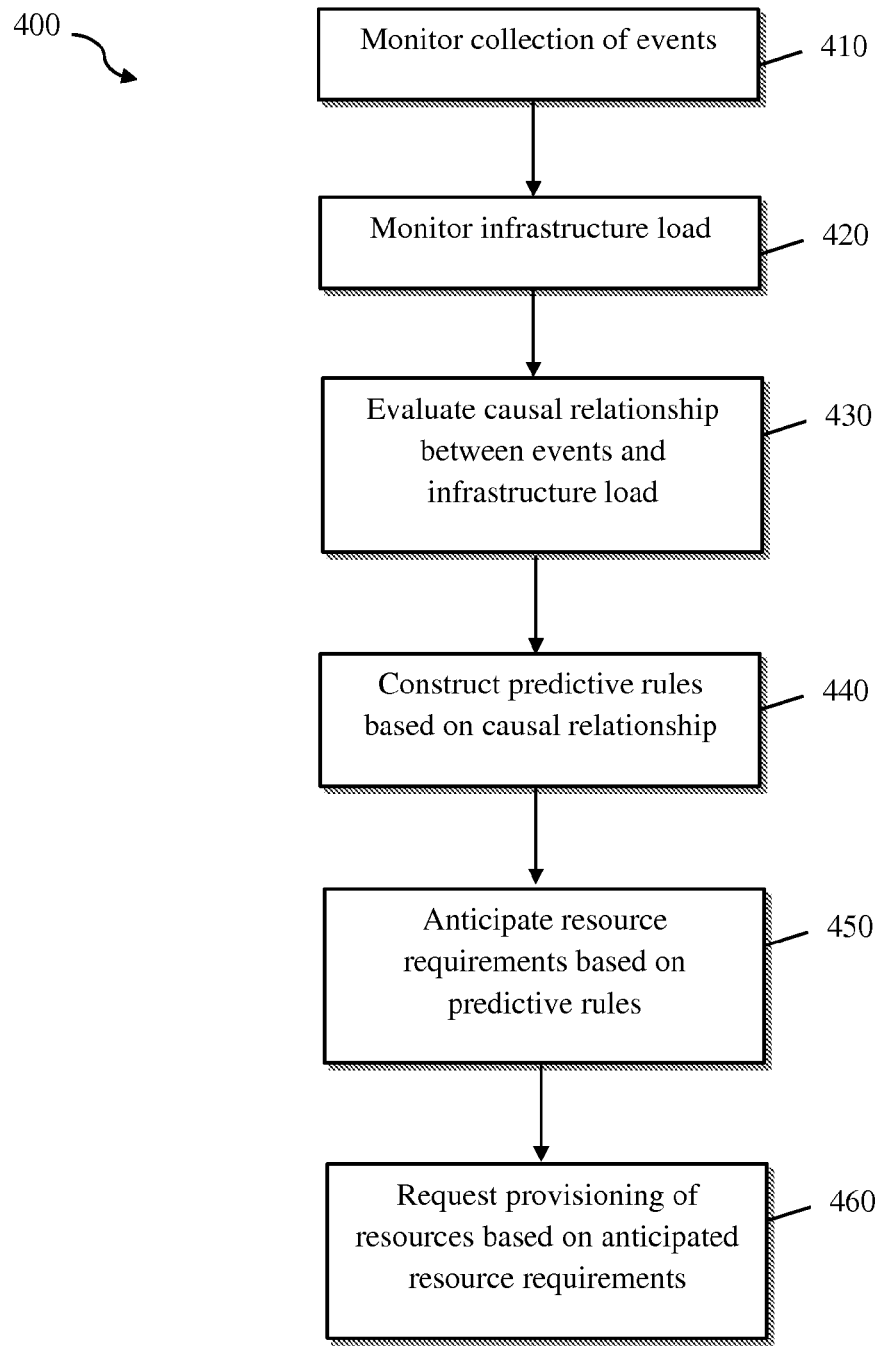
FIG. 4 depicts a flow diagram of a process for predictively provisioning cloud resources based on human behaviors and heuristics according to an embodiment

With reference to FIG. 4, a process 400 performed by an embodiment of the resource provisioning processing 67 is generally shown. As shown in FIG. 4, the process 400 predictively provisions cloud resources based on human behaviors and heuristics according to an embodiment.

At block 410, a collection of events relating to a customer application is monitored according to an embodiment. The process 400 may continuously monitor a plurality of data feeds from public sources from the Internet and private sources directly from businesses. According to an embodiment, the plurality of data feeds may include a selected one or more of news feeds, network statistics (e.g., Internet statistics), weather reports, social networking data, and company data. The collected regional or global events are stored in a heuristic database for later evaluation, as discussed below in block 430.

At block 420, an infrastructure load on resources is monitored for the customer application according to an embodiment. A collection of load metrics from a cloud service for the customer's application is monitored and also stored in the heuristic database for later evaluation, as discussed below in block 430.

At block 430, a causal relationship between an event and the infrastructure load is evaluated according to an embodiment. Heuristic analysis is used to update behavioral rules based on the causal links in human response to a particular event. In other words, the causal relationships between the historical data collected in blocks 410 and 420 are evaluated at block 430, according to an embodiment.

These relationships update the predictive rules between human response and infrastructure forecasting, as shown in block 440. A predictive rule is constructed based on the causal relationship according to an embodiment. The predictive rule of an embodiment forecasts human behavior responses to an occurrence of the event.

At block 450, resource requirements are anticipated based on the predictive rule according to an embodiment. Using the current iteration of data collected in the heuristic database, the predictive rule may be applied to generate anticipated cloud resource requirements and update a forecast for cloud provisioning according to the anticipated resource requirements. According to an embodiment, a notification and/or approval request may be transmitted to a designated user (e.g., business owner) prior to requesting the provisioning of the anticipated resource requirements from a cloud provisioning service.

According to an embodiment, before proactively provisioning cloud resources, static business rules may be applied to the anticipated resource requirements. The static business rules may include, but are not limited to, one or more of priority parameters, cost parameters, and capacity parameters. The business rules keep the provisioning requests within approved business guidelines and notification profiles.

Once the business rules are applied, a provisioning of resources in a service domain is requested for the anticipated resource requirements, as shown in block 460. The provisioning request is sent to the cloud in a structured request according to an embodiment. This request may be tailored to follow open standards or custom messaging.

According to an embodiment, the cloud provisioning service then completes the request based on its optimization rules. The optimization rules of an embodiment may include, but are not limited to, one or more of cost parameters, performance parameters, and location parameters.

According to another embodiment, responsive to the additional availability of provisioned resource capacity in the cloud, new load metrics will be collected as shown in block 420 and these new load metric will be used to validate the predictive rule.

Technical effects and benefits include a predictive provisioning of a set of cloud service resources located in private or global clouds. These cloud resource services may be deployed based on predictive analytics. The predictive analytics of embodiments include evaluating patterns of human behaviors coupled with applying heuristics to anticipate and provision the appropriate cloud resources to ensure capacity to meet customer requirements. Analytics are used to refine and maintain these heuristics via a self-learning model and anticipate resultant human behavior based on prior actual resource usage according to an embodiment.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system, comprising:
 a processor for executing the computer readable instructions to perform a method comprising:
  monitoring a collection of world or local events relating to a customer application, wherein monitoring comprises evaluating a plurality of data feeds comprising a selected one or more of news feeds, network statistics, weather reports, social networking data, and company data;

monitoring an infrastructure load on resources for the customer application;

evaluating a causal relationship between a particular event from the collection of world or local events and the infrastructure load based on historical data obtained from a heuristic database, wherein evaluating the causal relationship comprises heuristic analysis to update a behavioral rule based on a causal link in human responses to the particular event;

constructing a predictive rule based on the causal relationship, wherein the predictive rule forecasts future human responses to a future occurrence of the particular event;

anticipating resource requirements based on the predictive rule; and requesting a provisioning of cloud resources in a service domain for the anticipated resource requirements.

2. The computer system of claim 1, wherein the predictive rule forecasts human behavior responses to an occurrence of the particular event.

3. The computer system of claim 1, the method further comprising applying static business rules to the anticipated resource requirements, the static business rules comprising a selected one or more of priority parameters, cost parameters, and capacity parameters.

4. The computer system of claim 1, wherein the anticipating of resource requirements further comprises notifying or requesting approval from a designated user prior to requesting the anticipated resource requirements.

5. The computer system of claim 1, the method further comprising provisioning the resources based on a set of optimization rules, the optimization rules comprising a selected one or more of cost parameters, performance parameters, and location parameters.

6. The computer system of claim 1, the method further comprising:

receiving new load metrics responsive to the provisioned resources; and validating the predictive rule based on the new load metrics.

* * * * *